Figures 1, 2, 3:
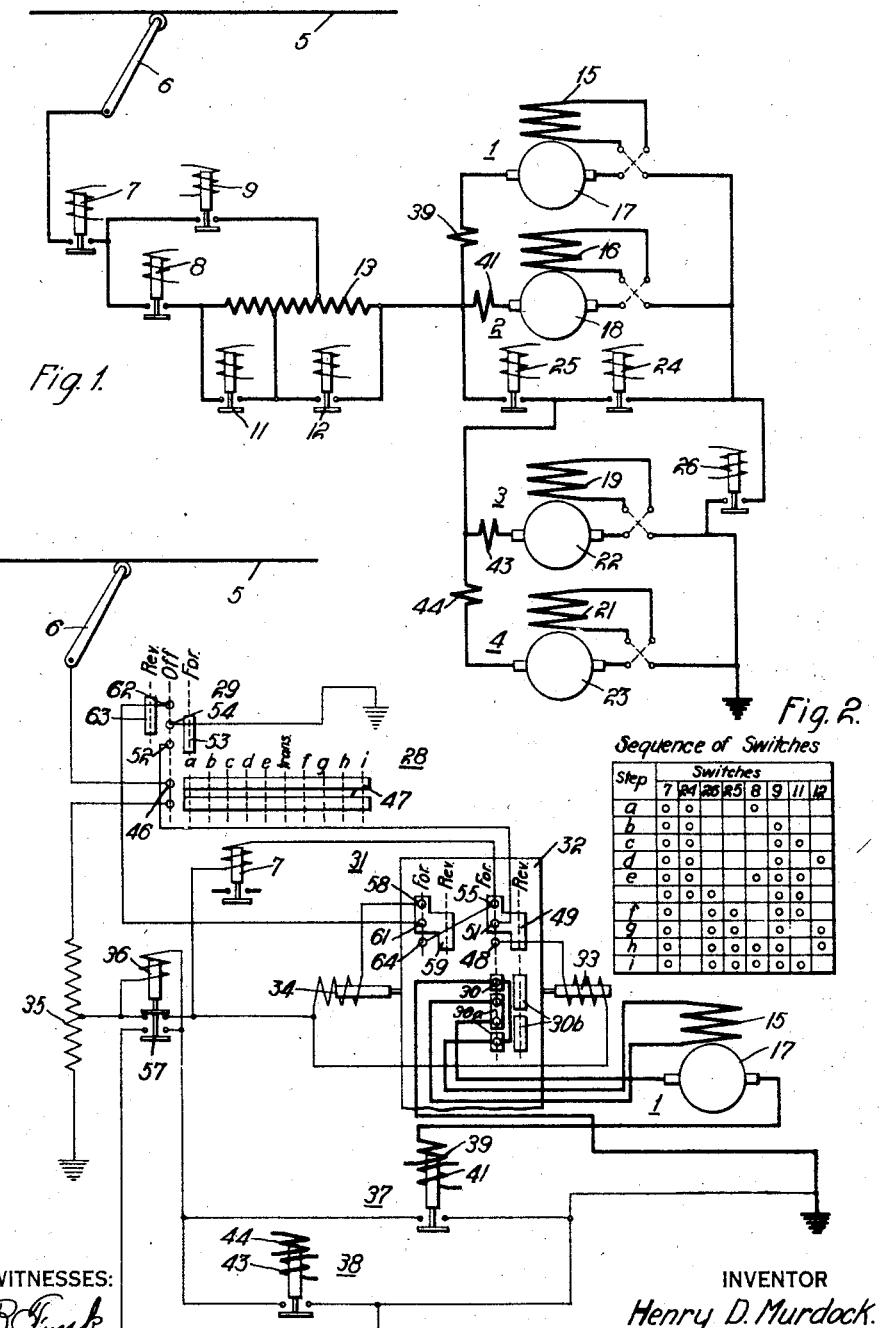

Dec. 11, 1923.

H. D. MURDOCK

SYSTEM OF CONTROL

Filed March 30, 1921

1,477,377

WITNESSES:

INVENTOR
Henry D. Murdock.
BY
ATTORNEY

Patented Dec. 11, 1923.

1,477,377

UNITED STATES PATENT OFFICE.

HENRY D. MURDOCK, OF WILKINSBURG, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

Application filed March 30, 1921. Serial No. 456,859.

*To all whom it may concern:*

Be it known that I, HENRY D. MURDOCK, a citizen of the United States, and a resident of Wilkinsburg, in the county of Allegheny and State of Pennsylvania, have invented a new and useful Improvement in Systems of Control, of which the following is a specification.

My invention relates to motor-control systems and it has particular relation to systems for the protection of a plurality of electrically-connected dynamo-electric machines from excessive overloads such, for example, as may occur upon a plurality of motors for driving an electric car or locomotive.

An object of my invention is to protect a motor-control system from an excessive rush of current in any part thereof. More specifically stated the object of my invention is to provide means for protecting a motor-control system from an electrical overload upon any one of a plurality of dynamo-electric machines in the system by opening a circuit-breaker which connects the dynamo-electric machines to a source of electrical energy and preventing the operation of means for reversing the connections of the dynamo-electric machines during energization thereof above a predetermined value during dynamic braking.

Heretofore, there have been means for protecting a motor-control system from an overload upon the system, but such protective means have been slow to respond to overload conditions, when the dynamo-electric machines were connected in a certain arrangement.

Briefly speaking, my invention consists in providing a relay having two actuating coils, which are respectively connected in series relation with a plurality of motors for governing the movement of a circuit-breaker and a main reverser.

These actuating coils are so arranged that, when the energization of the motors is substantially equal, the magnetizations of the actuating coils so oppose one another that the relay will not operate. Upon an electrical overload occurring in one of the motors, the balanced condition of the opposing magnetic fields of the actuating coils of the relay will no longer be established, and the more strongly energized actuating coil will cause the relay to assume its closed position, thereby opening the circuit-breaker. The main reverser is rendered inoperative during dynamic braking by the relay being actuated to its closed position, as the actuating coils thereof assist one another under such conditions.

For a better understanding of my invention, reference may be made to the accompanying drawings, Figure 1 of which is a schematic view of a motor-control system embodying my invention;

Fig. 2 is a sequence chart of well-known form, showing the order of closure of the contactors of the control system shown in Fig. 1, and Fig. 3 is a diagrammatic view of a plurality of auxiliary circuits for governing a plurality of switches shown in Fig. 1.

Referring to Fig. 1, a plurality of motors 1, 2, 3 and 4 are energized from a suitable source of electrical energy, such, for example, as a trolley 5, through a trolley-pole 6, a line switch or circuit-breaker 7, one or more accelerating contactors 8, 9, 11 and 12 and a starting resistor 13.

The motors 1 and 2 are permanently connected in parallel relation and have series field-magnet windings 15 and 16, respectively, and armatures 17 and 18, respectively. The motors 3 and 4 are permanently connected in parallel relation and have series field-magnet windings 19 and 21, respectively, and armatures 22 and 23, respectively.

The group of motors 1 and 2 may be connected in series relation with the motors 3 and 4 by means of a series contactor 24 and may be connected in parallel relation with the motors 3 and 4 by means of a parallel contactor 25 and a ground contactor 26.

Referring to Fig. 3, a master controller 28, having an "off" position and plurality of operative positions *a* to *i*, inclusive, governs the acceleration of the motors 1, 2, 3 and 4. The motors may be connected for forward operation by means comprising a master reverser 29 having an "off" position, a forward position and a reverse position. The master reverser 29 governs the movement of a main reverser 31 having a forward and a reverse position.

The main reverser 31 comprises a movable drum 32, which may be actuated to either its forward or its reverse position by means of suitable actuating coils 33 and 34, respectively.

For the sake of simplicity, only the connections for reversing the connections of the series field-magnet winding 15 to the armature 17 of the motor 1 is shown. The series field-magnet windings 16, 19 and 21 of the motors 2, 3 and 4 have their connections to the corresponding armatures 18, 22 and 23 reversed in the same manner, that is, by disengaging a plurality of forward contact segments 30$^a$ forming part of the main reverser 31 from contact terminals 30 and by actuating the reverse contact segments 30$^b$ into engagement with the contact terminals 30. All of the accelerating contactors 8, 9, 11 and 12, series contactor 24, parallel contactor 25 and ground contactor 26 have their actuating coils energized through a control resistor 35, in accordance with well-known practice.

The energization of the actuating coils 33 and 34 of the main reverser 31 and the actuating coil of the circuit-breaker 7 are governed by the relay 36, which is normally closed. The energization of the actuating coil of relay 36 is governed by relays 37 and 38, both of which are normally in their open positions.

The relay 37 is provided with two actuating coils 39 and 41, which are connected in series relation with the armature 17 of the motor 1 and the armature 18 of the motor 2, respectively. The relay 38 is provided with a plurality of actuating coils 43 and 44, which are connected in series relation with the armature 22 of the motor 3 and the armature 23 of the motor 4, respectively.

The actuating coils 39 and 41 of the relay 37 are so designed and positioned upon the relay 37, that, when their energization is substantially equal, they neutralize one another and the relay 37 remains in its open position. If, for any reason, the magnetization of either the actuating coil 39 or the coil 41 should become greater than the other, the relay 37 will close.

The actuating coils 43 and 44 of the contactor 38 are so arranged and designed, that, when their magnetic fields oppose each other and are substantially equal, movable contact member of the relay 38 remains in its open position. If the energization of either of the actuating coils 43 or 44 becomes greater by a predetermined value than that of the other, the movable contact member of the relay 38 will be actuated to its closed position.

The operation of the system embodying my invention is begun by actuating the master reverser 29 to its forward position and then actuating the master controller 28 to position $a$. A circuit is thereby established from the trolley 5 through contact terminals 46 and contact segment 47 of the master controller 28 and control resistor 35 to ground.

When the control resistor 35 is energized and master reverser 29 is in its forward position, and the main reverser 31 in its reverse position, the actuating coil 33 of the main reverser 31 is energized by a circuit extending from control resistor 35 through the contact members of relay 36, actuating coil 33 of main reverser 31, contact terminal 48, contact segment 49, contact terminal 51 of the main reverser 31, contact terminal 52 of the master reverser 29, contact segment 53 and contact terminal 54 to ground.

The energization of the actuating coil 33 causes the main reverser 31 to be actuated to its forward position, thereby breaking the circuit comprising the actuating coil 33 and establishing a circuit from the control resistor 35 through the contact members of relay 36, actuating coil of circuit breaker 7, contact terminal 55 of main reverser 31, contact segment 49, contact terminal 51 of main reverser 31, contact terminal 52 of master reverser 29, contact segment 53 and contact terminal 54 to ground.

The actuating coils of the accelerating contactor 8 and of series contactor 24 are energized simultaneously with the closing of the line switch 7 by a plurality of circuits that it is considered unnecessary to trace. When the line switch 7, accelerating contactor 8 and series contactor 24 are closed, a circuit is established from the trolley 5 through line switch 7, accelerating contactor 8, starting resistor 13, parallel-connected actuating coils 39 and 41 of the relay 37, armatures 17 and 18 and series field magnet windings 15 and 16 of the parallel-connected motors 1 and 2, respectively, contact members of series contactor 24, parallel-connected actuating coils 43 and 44 of the relay 38, armatures 22 and 23 and series field-magnet windings 19 and 21 of the parallel-connected motors 3 and 4, respectively, to ground.

The motors 1, 2, 3 and 4 are accelerated by shunting portions of the starting resistor 13 by the closure of the accelerating contactors 8, 9, 11 and 12 in accordance with the sequence chart shown in Fig. 2, upon the master controller 47 being actuated through positions $a$, $b$, $c$ and $d$ to $e$, which is the full-series running position.

The motors 1, 2, 3 and 4 are further accelerated by actuating the master controller 47 through the transition position to position $f$, thereby opening the series contactor 24 and accelerating contactor 8 and closing the parallel contactor 25 and the ground contactor 26, in accordance with the sequence chart shown in Fig. 2.

The motors are again accelerated upon the actuation of the master controller 47 through positions *g* and *h* to *i*, which is the full parallel running position, by shunting various portions of the resistor 13 in accordance with the sequence chart shown in Fig. 2.

This method of acceleration is well known in the art and the control circuits for the contactors have been omitted except in so far as they are necessary to describe my invention. If, for any reason, a short circuit occurs, caused by a ground upon any of the motors 1, 2, 3 and 4, the operation of my protective system is as follows:

If, for example, the short-circuit occurs upon the motor 2, causing an excessive rush of current through the actuating coil 41 of the relay 37, the energization of the actuating coil 41 will become sufficiently greater than that of the actuating coil 39 of the relay 37 to cause the contactor of the relay 37 to assume its closed position, thereby establishing a circuit through the control resistor 35, actuating coil of relay 36, and contact members of relay 37 to ground.

The energization of the actuating coil 36 causes the movable contact member of the relay 36 to assume its open position, thereby opening a circuit comprising the actuating coil of the circuit-breaker 7, causing the circuit-breaker to assume its open position, and thus de-energize the motors 1, 2, 3 and 4.

Circuits comprising the actuating coils 33 and 34 are also broken upon the relay 36 assuming its open position, thereby making it impossible to move the main reverser 31 from its forward position to its reverse position.

The relay 36 will not return to its closed position until the master controller 47 has been actuated to its "off" position, since a holding circuit for the relay 36 is provided by a circuit from the control resistor 35 through the actuating coil of relay 36 and an auxiliary contact member 57 of the relay 36 to ground.

If a sufficiently heavy overload occurs on either the motor 3 or the motor 4, then the corresponding actuating coil 43 or 44 will be so excessively energized that it will cause the movable contact member of the relay 38 to assume its closed position, thereby establishing a circuit from control resistor 35 through the actuating coil of the relay 36 and the contact members of the relay 38 to ground.

If, for any reason, one of the motors 1, 2, 3 or 4 becomes de-energized, then the corresponding one of the actuating coils 39, 41, 43 or 44 is likewise de-energized and the actuating coil of the corresponding relay, 37 or 38, that remains energized will cause the movable contact member to assume its closed position.

It is apparent that, by means of my invention, I have provided means for rapidly opening the circuit-breaker of a control system upon the occurrence of an overload or no load in any one of a plurality of motors operating in a control system. It is also apparent that systems embodying my invention may be employed with generators or other electrical devices in substantially the same manner as is shown for the motors of an electric car or locomotive.

If electrical braking of the motors is required, the master controller 47 is actuated to its "off" position and the master reverser 29 is actuated to its reverse position, in accordance with the usual practice, after which the master controller 28 is again actuated to its first position.

A circuit is then established from the trolley 5 through contact terminals 46 and contact segment 47 of the master controller 28 and control resistor 35 to ground. A circuit comprising the reverse actuating coil 34 of the main reverser 31 is established from the control resistor 35 through the contact members of the relay 36, actuating coil 34 of the main reverser 31, contact terminal 58 of the main reverser 31, contact segment 59, contact terminal 61, contact terminal 62 of the master reverser 29, contact segment 63 and contact terminal 54 to ground.

The energization of the reverse actuating coil 34 causes the main reverser 31 to be actuated to its reverse position, thereby establishing a circuit from the control resistor 35 through the contact members of the relay 36, the actuating coil of circuit-breaker 7, contact terminal 64 of main reverser 31, contact segment 59, contact terminal 61, contact terminal 62 of the master reverser 29, and contact segment 63 and contact terminal 54 of the master reverser 29 to ground.

The terminals of the series field-magnet windings 15, 16, 19 and 21 of the motors 1, 2, 3 and 4, respectively, are now reversed with relation to the armature terminal and ground by the contact terminals 30 of the main reverser 31 being engaged by the reverse contact segments 30ᵇ. The motors are energized from the trolley 5 through line switch 7, accelerating contactor 8 and starting resistor 13. The operation of the motors during these conditions is known as plugging.

If dynamic braking is desired, the master controller 47 is again actuated to its "off" position, thereby de-energizing the control resistor 35 and, consequently, the actuating coils of line switch 7, accelerating contactor 8 and series contactor 24.

Two dynamic braking circuits or closed loops will be established, one of which comprises armature 17 and series field-magnet winding 15 of the motor 1, series field-magnet winding 16 and armature 18 of motor 2 and actuating coils 41 and 39 of the overload relay 37. The second dynamic braking circuit is established through the parallel-connected motors 3 and 4 and comprises armature 22 and series field-magnet winding 19 of the motor 3, series field-magnet winding 21 and armature 23 of the motor 4 and the actuating coils 44 and 43 of the relay 38.

It will be noted that the magnetizations of the actuating coils 39 and 41 of the relay 37 no longer oppose each other, as the current traversing both actuating coils is in the same direction; consequently, the contact member 37 assumes its closed position. Likewise, the actuating coils 43 and 44 are energized in the same manner, to thereby close the relay 38. So long as either the relay 37 or the relay 38 is in its closed position, it will be impossible to actuate the main reverser 31, for as soon as the control resistor 35 is energized the actuating coil of the relay 36 will be energized and a circuit comprising either the actuating coil 33 or the actuating coil 34 of the main reverser 31 will be broken.

It is advantageous to prevent movement of the main reverser 31 from either its forward position to its reverse position, or vice versa, as the heavy current resulting from dynamic braking would cause severe arcing between the contact terminals and the drum segments of the main reverser 31 should the circuit be opened, while this heavy current continues.

It is apparent that a push-button may be placed in circuit with the actuating coil of the relay 36, if desired, so as to permit the main reverser 31 to be thrown, if any emergency existed which would make it imperative.

In a two-motor control system, any occurrence of motor flashing or grounding may be safeguarded against by employing a relay, for the same purpose as previously described, having two actuating coils, one of the coils being placed in circuit with the motors and adjacent to the trolley, the other of said coils being in circuit with the motors and adjacent to ground.

While I have described my invention in its preferred form it is apparent that minor modifications may be made in the arrangement of the circuits and apparatus employed without departing from the spirit of my invention. I desire, therefore, to be limited only by the scope of the appended claims.

I claim as my invention:

1. The combination with a plurality of motors and means comprising a controller having a plurality of positions for energizing said motors, of means for de-energizing said motors, said means comprising a plurality of actuating coils respectively connected in series relation with said motors, and means for preventing said de-energizing means from becoming inoperative until after said controller has been actuated to a predetermined position.

2. The combination with a plurality of motors and a source of electrical energy, of a circuit-breaker for connecting said motors to said source, a controller having a plurality of positions for governing said circuit breaker, and means comprising a plurality of actuating coils for governing said circuit-breaker, each of said coils being in circuit with a different one of said motors, and means for preventing said circuit breaker from closing after said first means has operated unless said controller is actuated to its off position.

3. The combination with a plurality of dynamo-electric machines and means for energizing said machines, of means comprising a plurality of relays for de-energizing said machines, one of said relays comprising a plurality of coils, each of said coils being in circuit with a different one of said machines and the magnetization of one of said coils opposing the magnetization of another of said coils during normal operation of said machines to render said de-energizing means inoperative, and the other of said relays being provided with means for rendering it inoperative after said first relay has operated.

4. The combination with a plurality of dynamo-electric machines, of a source of electric energy, a circuit-breaker having an actuating coil for connecting said machines to said source, a relay provided with a holding circuit for deenergizing said coil, and means comprising a second relay having a plurality of actuating coils for governing the operation of said first relay, the magnetization of the actuating coils of said second relay neutralizing each other during normal operation of said machines.

5. The combination with a plurality of dynamo-electric machines, of a source of electrical energy, a circuit-breaker having an actuating coil for connecting said machines to said source, a relay for de-energizing the actuating coil of said circuit-breaker, and a second relay comprising a plurality of actuating coils for governing the operation of said first relay, said second relay having its actuating coils in circuit with the respective machines.

6. The combination with a plurality of dynamo-electric machines, of means comprising a controller having a plurality of positions for energizing said machines, and means for de-energizing said machines upon the occurrence of a predetermined overload in one of said machines provided said overload is greater upon said one machine than upon another of said machines, and means comprising said de-energizing means for preventing said energizing means from operating until said controller has been actuated to a predetermined position.

7. The combination with a plurality of dynamo-electric machines, a controller for governing the speed of said machines and means for reversing the connections of said machines, of means comprising a plurality of relays for rendering said reversing means inoperative upon the energization of said machines above a predetermined value, one of said relays comprising a plurality of actuating coils, said coils being respectively connected in circuit with said machines, and another of said relays preventing said machines from being re-energized until after said controller has been actuated to its off position.

8. The combination with a plurality of motors and a controller for governing the speed of said motors, of means for reversing the operation of said motors, said means being adapted for effecting dynamic braking during predetermined conditions, and means comprising a relay for preventing cessation of said dynamic braking until after the current traversing said motors has decreased below a predetermined value, and said controller has been actuated to its off position.

9. The combination with a plurality of motors and a controller having a plurality of positions for governing said motors, of means for reversing the operation of said motors, said means being adapted for effecting dynamic braking during predetermined conditions, and means for preventing cessation of said dynamic braking until after the current traversing said motors has decreased below a predetermined value, said preventing means comprising a relay having a plurality of actuating coils, said coils being respectively connected in series relaton with said motors, and means for preventing said motors from being re-energized prior to said controller being actuated to a predetermined position.

10. The combination with a plurality of motors, each having an armature and a field-magnet winding and a controller having a plurality of positions for governing the speed of said motors, of a main reverser having a forward and a reverse position for reversing the relation of each of said windings to the corresponding armature, means for actuating said main reverser to its forward and to its reverse position, and means comprising a relay having a plurality of actuating coils for preventing said actuating means from operating said main reverser during dynamic braking, each of said actuating coils being in circuit with a different motor from any of the other actuating coils, and a second relay for preventing said main reverser from being actuated until said controller has been returned to a predetermined position.

11. The combination with a plurality of motors and means for reversing said motors, of a controller for governing the speed of said motors, a source of electrical energy, a circuit-breaker having an actuating coil for connecting said machine to said source, and means comprising a relay for governing the energization of the actuating coil of said circuit-breaker, and means comprising a second relay having a plurality of actuating coils for governing said first relay, the magnetization of said actuating coils of said second relay neutralizing each other during normal operation of said machines but co-operating to prevent said first relay from being actuated during dynamic braking of said motors, said first relay preventing said circuit breaker from operating until after said controller has been actuated to its off position.

12. The combination with a plurality of motors, of means comprising a controller having a plurality of positions for energizing said motors, means for reversing said motors, said reversing means co-operating with said motors for effecting dynamic braking during predetermined conditions, and means comprising a plurality of relays, one of said relays having a plurality of actuating coils for governing said energizing means and said reversing means, the magnetization of said coils opposing and balancing each other during normal operation of said motors to render said relay inoperative but assisting each other during dynamic braking to prevent the operation of said reversing means, another of said relays rendering the system inoperative until after said controller has been actuated to a predetermined position.

In testimony whereof, I have hereunto subscribed my name this 18th day of March, 1921.

HENRY D. MURDOCK.